United States Patent
Goguen et al.

(10) Patent No.: US 9,154,631 B2
(45) Date of Patent: *Oct. 6, 2015

(54) METHOD AND APPARATUS FOR IDENTIFYING A CONFERENCE CALL FROM AN EVENT RECORD

(75) Inventors: Joseph Patrick Thomas Goguen, Los Gatos, CA (US); Manish Sunder Punjabi, Los Altos, CA (US); Carsten Michael Bergmann, San Jose, CA (US); Harmeet Singh, San Jose, CA (US); Christina Evelyn Lucey, San Francisco, CA (US); Eric Reyes, Menlo Park, CA (US)

(73) Assignee: BlackBerry Limited, Waterloo, Ontario (CA)

(*) Notice: Subject to any disclaimer, the term of this patent is extended or adjusted under 35 U.S.C. 154(b) by 149 days.

This patent is subject to a terminal disclaimer.

(21) Appl. No.: 13/422,767

(22) Filed: Mar. 16, 2012

(65) Prior Publication Data

US 2012/0269333 A1  Oct. 25, 2012

Related U.S. Application Data

(60) Provisional application No. 61/454,312, filed on Mar. 18, 2011.

(51) Int. Cl.
*H04L 12/18* (2006.01)
*H04M 3/56* (2006.01)
*H04N 7/15* (2006.01)

(52) U.S. Cl.
CPC ...... *H04M 3/565* (2013.01); *H04M 2203/2072* (2013.01)

(58) Field of Classification Search
CPC ..................... H04M 3/565; H04M 2203/2072
USPC ............... 370/260–262; 379/202.01–206.01, 379/93.21, 158; 455/416; 348/14.08
See application file for complete search history.

(56) References Cited

U.S. PATENT DOCUMENTS

| 7,200,638 | B2 | 4/2007 | Lake |
| 7,343,008 | B1 | 3/2008 | Frankel |

(Continued)

FOREIGN PATENT DOCUMENTS

WO  2005/115035  12/2005

OTHER PUBLICATIONS

Extended European search report pursuant to Rule 62 EPC, the European search report (R. 61 EPC) or the partial European search report/Declaration of no search (r. 63 EPC) and the European search opinion for Application No. 12159955.9, dated May 15, 2013, 6 pages.
Saleem, A. et al., Media Server Markup Language, Internet Draft, draft-saleem-msml-07, Aug. 7, 2008, IETF document, available at: http://tools.ietf.org/html/draft-saleem-msml-07.

(Continued)

*Primary Examiner* — Harry S Hong
(74) *Attorney, Agent, or Firm* — Fish & Richardson P.C.

(57) ABSTRACT

A method for identifying a conference call from a communication device, wherein the communication device includes a memory for storing a calendar event record. The method includes: parsing at least some of the calendar event record, wherein the parsing includes an automatic discovery feature; determining, based on the parsing, whether the calendar event record includes conference call scheduling information in relation to a scheduled conference call session; generating, based on the parsing, one or more identifiers for at least some of the conference call scheduling information; and storing in the memory the one or more identifiers. A host communication device and a non-host participant communication device can also be configured for performing the method.

27 Claims, 11 Drawing Sheets

(56) References Cited

U.S. PATENT DOCUMENTS

| | | | |
|---|---|---|---|
| 7,496,188 B2 | 2/2009 | Saha et al. | |
| 7,499,535 B1 | 3/2009 | Ivory et al. | |
| 7,525,928 B2 | 4/2009 | Cutler | |
| 7,571,249 B2 | 8/2009 | Wu | |
| 7,626,951 B2 | 12/2009 | Croy et al. | |
| 7,633,517 B2 | 12/2009 | Yim | |
| 7,889,851 B2 | 2/2011 | Shah et al. | |
| 7,907,551 B2 | 3/2011 | Croy et al. | |
| 8,271,004 B2 | 9/2012 | Vinding | |
| 8,467,320 B2 | 6/2013 | Croy et al. | |
| 8,699,686 B2 * | 4/2014 | Goguen et al. | 379/202.01 |
| 2003/0072298 A1 | 4/2003 | Slobodin et al. | |
| 2004/0203350 A1 | 10/2004 | Shultz et al. | |
| 2005/0249346 A1 | 11/2005 | Schnurr | |
| 2007/0121909 A1 * | 5/2007 | Schnurr | 379/355.01 |
| 2007/0218885 A1 | 9/2007 | Pfleging et al. | |
| 2008/0043961 A1 | 2/2008 | Kim et al. | |
| 2008/0069012 A1 | 3/2008 | Decker et al. | |
| 2008/0096594 A1 | 4/2008 | Vinding | |
| 2008/0152113 A1 | 6/2008 | Chang et al. | |
| 2008/0304646 A1 | 12/2008 | Nguyen et al. | |
| 2009/0177974 A1 | 7/2009 | Cox et al. | |
| 2009/0210802 A1 | 8/2009 | Hawkins et al. | |
| 2009/0316871 A1 | 12/2009 | Grigsby et al. | |
| 2010/0034122 A1 | 2/2010 | Croy et al. | |
| 2010/0150330 A1 | 6/2010 | Perry et al. | |
| 2010/0208625 A1 * | 8/2010 | Logan et al. | 370/260 |
| 2010/0220847 A1 | 9/2010 | Yap et al. | |
| 2011/0007887 A1 * | 1/2011 | Green et al. | 379/203.01 |
| 2011/0268262 A1 | 11/2011 | Jones et al. | |
| 2012/0230485 A1 * | 9/2012 | Yap et al. | 379/202.01 |
| 2012/0269334 A1 | 10/2012 | Goguen et al. | |

OTHER PUBLICATIONS

Rosenberg, J. et al., RFC 3261—Session Initiation Protocol, Jun. 2002, The Internet Society, available at: http://www.ietf.org/rfc/rfc3261.txt.

Androutsopoulos, Ion et al., Learning to Filter Spam E-Mail: A Comparison of a Naive Bayesian and a Memory-Based Approach, Proceedings of the workshop "Machine Learning and Textual Information Access", H. Zaragoza, P. Gallinari,and M. Rajman (Eds.), 4th European Conference on Principles and Practice of Knowledge Discovery in Databases (PKDD-2000), Lyon, France, Sep. 2000, pp. 1-13.

Sahami, Mehran et al., A Bayesian Approach to Filtering Junk E-Mail, AAAI 1998 Workshop on Learning for Text Categorization, AAAI Technical Report WS-98-05.,1998, AAAI (www.aaai.org).

Canadian Office Action dated Nov. 22, 2013, issued in Canadian Application No. 2,771,503 (3 pages).

Extended European Search Report dated Aug. 27, 2012, issued in European Application No. 12159950.0 (8 pages).

European Examination Report dated Feb. 7, 2014, issued in European Application No. 12159950.0 (4 pages).

Office Action dated Mar. 25, 2013, issued in U.S. Appl. No. 13/423,144 (17 pages).

Office Action dated Jun. 27, 2013, issued in U.S. Appl. No. 13/423,144 (10 pages).

Canadian Office Action dated Oct. 30, 2014, issued in Canadian Application No. 2,771,501 (2 pages).

Canadian Office Action dated Oct. 30, 2014, issued in Canadian Application No. 2,771,503 (2 pages).

Canadian Office Action dated Nov. 28, 2013, issued in Canadian Application No. 2,771,501 (2 pages).

* cited by examiner

METHOD AND APPARATUS FOR IDENTIFYING A CONFERENCE CALL FROM AN EVENT RECORD

RELATED APPLICATIONS

This application claims priority to U.S. Provisional Application No. 61/454,312, filed Mar. 18, 2011, entitled "METHOD FOR IDENTIFYING A CONFERENCE CALL FROM AN EVENT RECORD," which is incorporated herein by reference.

TECHNICAL FIELD

Example embodiments relate to conference call systems and methods, for example for identifying a conference call from a communication device.

BACKGROUND

During a conference call, voice or media connections are typically made between two or more communication devices such as telephones or mobile phones.

When scheduling a conventional conference call, a user typically is required to configure the conference call manually. For example, all conference call information would be entered into specific fields or tags, including the time, attendees, host, and conference access number. Specific menus and interfaces would be used to implement these functions. When a quick meeting needs to be convened, there is time overhead required to set up the meeting. In addition, the user can be distracted from the substantive content of the meeting in order to facilitate the administrative aspect in coordinating the meeting.

When receiving a conference call invitation in a device, typically the specific fields or tags are used to determine the particular conference call details. This can raise compatibility issues. For example, in some conventional systems, both the host and the participant can be forced to use the same or compatible scheduling software applications, in order to exchange suitable scheduling information. However, in many instances the participants can be using a variety of different applications for scheduling, such as Google™ Calendar, Apple™ iCal, GoDaddy™ Online Group Calendar, IBM Lotus Notes™, Yahoo™ Calendar, and Microsoft Outlook™. These programs typically use a calendar standard format for merely communicating and setting up calendar appointments, and are not specific to setting up conference calls.

There are yet further some variety of different vendors who have dedicated templates for scheduling conference calls, for example InterCall, WebEx, ACT, Live Meeting, and e-Dial. However, any additional specialized features in these templates typically require both the host and the participant to have a dedicated or compatible software application to recognize the particular template in order to use any specialized tags or fields. This can result in a relatively inflexible result when attempting to schedule a conference call between multiple parties.

Other difficulties with existing teleconferencing systems will be apparent to those skilled in the art in view of the detailed description below.

BRIEF DESCRIPTION OF THE DRAWINGS

Reference will now be made, by way of example, to the accompanying drawings which show example embodiments, and in which.

Similar reference numerals can be used in different figures to denote similar components.

DESCRIPTION OF EXAMPLE EMBODIMENTS

Figure 1:
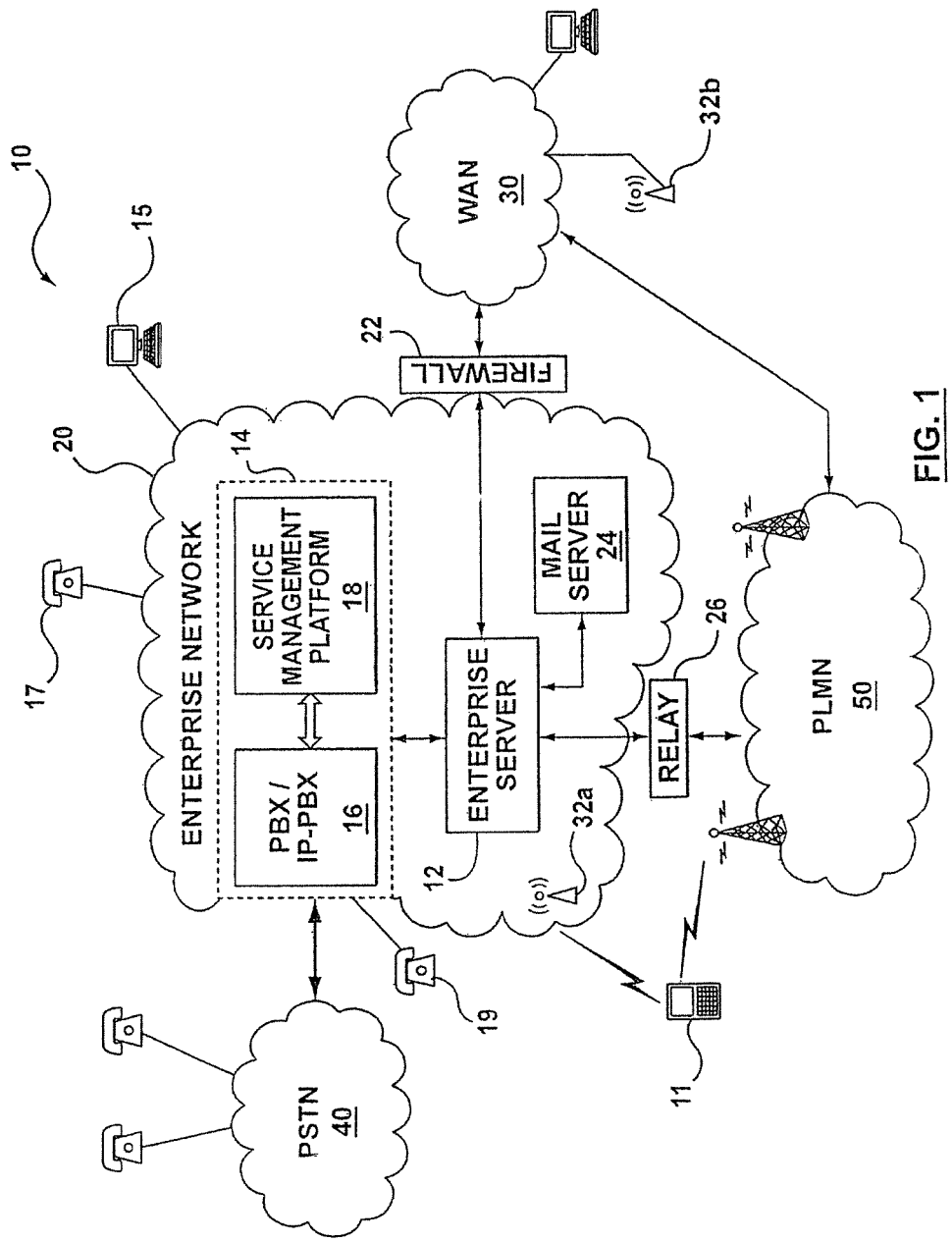
FIG. 1 shows, in block diagram form, an example system for managing enterprise-related mobile calls, including an enterprise communications platform, to which example embodiments can be applied.

Some example embodiments generally relate to an automatic discovery feature with respect to a calendar event record. Example embodiments can parse the calendar event record to determine whether the calendar event record relates to a conference call, and identify any conference call scheduling information. The device can parse the calendar meeting for identifying conference call details contained within the calendar event record, for example from the meeting notes. Some example embodiments use certain keywords and patterns to identify a conference call by parsing natural language. For example, natural language parsing techniques can be used to convert unstructured text to structured text.

Some example embodiments can be implemented by a host communication device for a conference call. A conference call record can be automatically populated with keywords when it intelligently recognizes a user's desire to convene a conference call session from a new or existing calendar meeting entry.

Some example embodiments can be implemented by a non-host participant communication device for a conference call. This can be applied to a calendar meeting that is received, or to existing stored calendar meetings. The calendar meeting can be identified as being in relation to a conference call, and address information such as dialing or link information can be identified and used to join the conference call at or before the time of the call.

In one example embodiment, there is provided a method for identifying a conference call from a communication device, wherein the communication device includes a memory for storing a calendar event record, the method including: parsing at least some of the calendar event record; determining, based on the parsing, whether the calendar event record includes conference call scheduling information in relation to a scheduled conference call session; generating, based on the parsing, one or more identifiers for at least some of the conference call scheduling information; and storing in the memory the one or more identifiers.

In another example embodiment, there is provided a non-transitory computer readable medium having recorded thereon statements and instructions for execution by one or more devices for identifying a conference call, said statements and instructions comprising code means for performing the method.

In yet another example embodiment, there is provided a communication device including: a communications subsystem; a memory for storing a calendar event record; and a controller configured for performing the method.

In yet another example embodiment, there is provided a communication device including: a communications subsystem; a memory; a display for displaying an interface for creating a calendar event record; and a controller configured for: receiving input through the interface for creation of the calendar event record, parsing at least some of the calendar event record, determining, based on the parsing, whether the calendar event record includes conference call scheduling information in relation to a scheduled conference call session, generating, based on the parsing, one or more identifiers for at least some of the conference call scheduling information, and storing in the memory the one or more identifiers.

In yet another example embodiment, there is provided a communication device including: a communications subsystem for receiving an invitation message, the invitation message including a calendar event record; a memory; and a controller configured for: parsing at least some of the calendar event record, determining, based on the parsing, whether the calendar event record includes conference call scheduling information in relation to a scheduled conference call session, generating, based on the parsing, one or more identifiers for at least some of the conference call scheduling information, and storing in the memory the one or more identifiers.

Example embodiments relate to the control and management of conference call communications. Although reference can be made to "calls" and "talk" in the description of example embodiments below, it will be appreciated that some of the described systems and methods can be applicable to session-based communications in general and not limited to voice calls. Reference to calls can for example include shared data (e.g. presentation content) as well as media sessions which can for example include video and/or audio. The various communications can include both synchronous and asynchronous communications to implement such "calls".

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 can be referred to as an enterprise network 20. It will be appreciated that the enterprise network 20 can include more than one network and can be located in multiple geographic areas in some embodiments.

The enterprise network 20 can be coupled, often through a firewall 22, to a wide area network (WAN) 30, such as the Internet. The enterprise network 20 can also be coupled to a public switched telephone network (PSTN) 40 via direct inward dialing (DID) trunks or primary rate interface (PRI) trunks.

The enterprise network 20 can also communicate with a public land mobile network (PLMN) 50, which can also be referred to as a wireless wide area network (WWAN) or, in some cases, a cellular network. The connection with the PLMN 50 can be made via a relay 26, as understood in the art.

The enterprise network 20 can also provide a wireless local area network (WLAN) 32a featuring wireless access points. Other WLANs 32 can exist outside the enterprise network 20. For example, WLAN 32b can be coupled to WAN 30.

The system 10 can include a number of enterprise-associated mobile devices 11 (only one shown). The mobile devices 11 can include devices equipped with communications modules for cellular communication through the PLMN 50, mobile devices equipped for Wi-Fi communications over one of the WLANs 32, or dual-mode devices capable of both cellular and data communications. WLANs 32 can be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 can be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 can roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The mobile devices 11 can be various types of communication devices. Such mobile devices 11 can include "Class A" devices, which are able to function continuously as dual-mode devices, capable of both media and data communications. Mobile devices 11 can also include "non-Class A" devices, which can function as dual-mode devices for initialization or prior to connection with the enterprise communications platform 14, but can lose data functionality once a media session (e.g., voice call) is established. The enterprise network 20 can also include additional client devices which are voice-only or media-only devices, which can be digital or analog for communication with the PSTN or PLMN, and which cannot have data capabilities (herein referred to as "voice-only" or "media-only" devices). In other embodiments, the mobile devices 11 can include any suitable client device configured with the communications functionality described herein, and can for example include computer devices, relays, proxies, gateways and any appropriate User Agents (as defined in SIP).

The enterprise network 20 typically includes a number of networked servers, computers, and other devices. For example, the enterprise network 20 can operatively connect one or more desktop or laptop computers 15 (one shown). The connection can be wired or wireless in some embodiments. The enterprise network 20 can also operatively connect to one or more digital telephone sets 17 (one shown).

The enterprise network 20 can include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages can be retrieved by the user using a messaging application, such as an e-mail client application. The messaging application can be operating on a user's computer 15 coupled to the enterprise network 20 within the enterprise. In some embodiments, the user can be permitted to access stored messages using a remote computer, for example at another location via the WAN 30 using a VPN connection. Using the messaging application, the user can also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Generally, the enterprise server 12 is configured to collectively serve the needs of the enterprise network 20, for example to provide and/or synchronize messaging, contacts and calendaring information between servers, desktop workstations 15, and mobile devices 11. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX can be a standard PBX or an IP-PBX, for simplicity the description below uses the term PBX to refer to both) 16 coupled with the PSTN 40 for routing incoming and outgoing voice calls for the enterprise. The PBX 16 is coupled to the PSTN 40 via DID trunks or PRI trunks, for example. The PBX 16 can use ISDN signaling protocols for setting up and tearing down circuit-switched connections through the PSTN 40 and related signaling and communications. In some embodiments, the PBX 16 can be coupled to one or more conventional analog telephones 19. The PBX 16 is also coupled to the enterprise network 20 and, through it, to telephone terminal devices, such as digital telephone sets 17, softphones operating on computers 15, etc. Within the enterprise, each individual can have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 can further include a Service Management Platform (SMP) 18 for performing some aspects of messaging or session control, like call control and advanced call processing features. The SMP 18 can, in some cases, also perform some media handling. Collectively the SMP 18 and PBX 16 can be referred to as the enterprise communications platform, generally designated 14. It will be appreciated that the enterprise communications platform 14 and, in particular, the SMP 18, is implemented on one or more servers having suitable communications interfaces for operatively connecting to and communicating with the PBX 16 and/or DID/PRI trunks. Although the SMP 18 can be implemented on a stand-alone server, it will be appreciated that it can be implemented into an existing control agent/server as a logical software component. As will be described below, the SMP 18 can be implemented as a multi-layer platform.

The enterprise communications platform 14 implements the switching to operatively connect session legs and can provide the conversion between, for example, a circuit-switched call and a VoIP call, or to operatively connect legs of other media sessions. In some embodiments, in the context of voice calls the enterprise communications platform 14 provides a number of additional functions including automated attendant, interactive voice response (IVR), call forwarding, voice mail, etc. It can also implement certain usage restrictions on enterprise users, such as blocking international calls or 1-900 calls. In many embodiments, Session Initiation Protocol (SIP) can be used to set-up, manage, and terminate media sessions for voice calls. Other protocols can also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 can allow the mobile device 11 to perform functions akin to those normally available on a standard office telephone, such as the digital telephone set 17 or analog telephone set 15. Example features can include direct extension dialing, enterprise voice mail, conferencing, call transfer, call park, etc.

Figure 2:
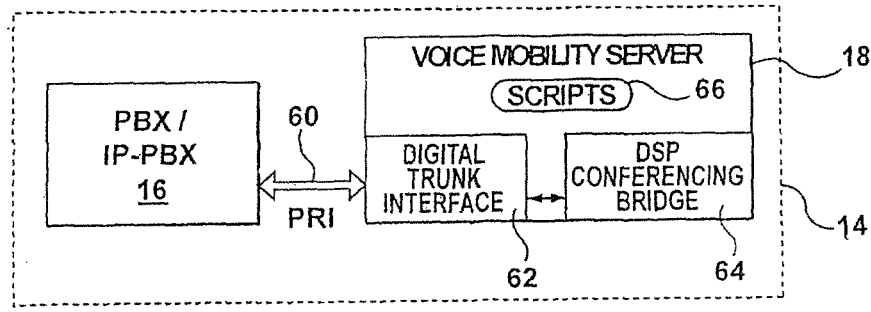
FIG. 2 shows, in block diagram form, further details of an embodiment of the enterprise communications platform.
Figure 3:
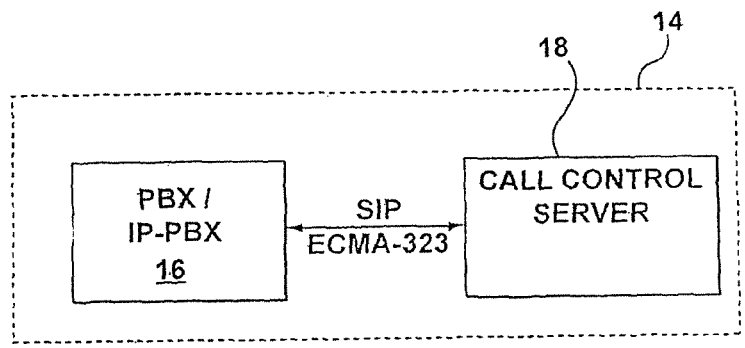
FIG. 3 shows another embodiment of the enterprise communications platform.
Figure 4:
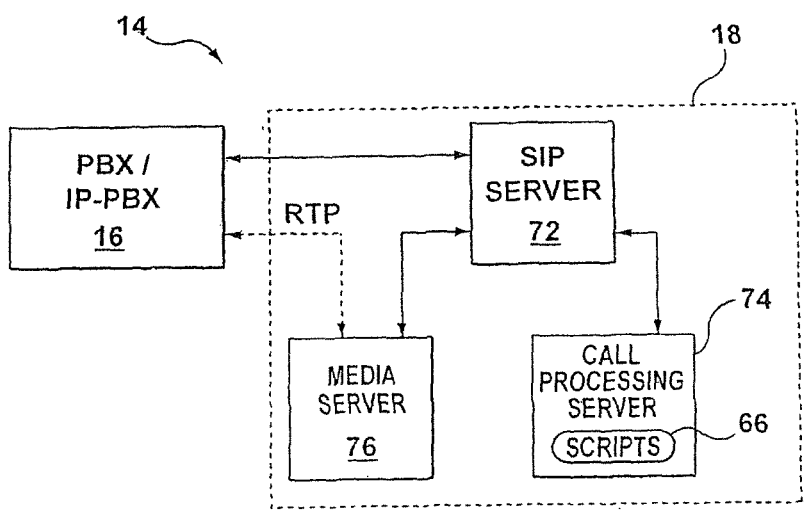
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI connection 60 or other suitable digital trunk. In some embodiments, the PRI connection 60 can include a first PRI connection, a second PRI connection, and a channel service unit (CSU), wherein the CSU is a mechanism for coupling computing devices to digital mediums in a manner that allows for the retiming and regeneration of incoming signals. It will be appreciated that there can be additional or alternative connections between the PBX 16 and the SMP 18.

In this embodiment, the SMP 18 assumes control over both call processing and the media itself. This architecture can be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 can be implemented as a plurality of telephonic cards, e.g. Intel Dialogic cards, interconnected by a bus and operating under the control of a processor. The digital trunk interface 62 can also be partly implemented using a processor module such as, for example, a Host Media Processing (HMP) processor.

The SMP 18 can include various scripts 66 for managing call processing. The scripts 66 are implemented as software modules, routines, functions, etc., stored in non-volatile memory and executed by the processor of the SMP 18. The scripts 66 can implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 can be referred to as a call control server 18. This architecture can be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 can employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 can communicate using Media Server Markup Language (MSML) as defined in IETF document Saleem A., "Media Server Markup Language," Internet Draft, draft-saleem-msml-07, Aug. 7, 2008. The media server 76 can be configured to perform Host Media Processing (HMP).

Other architectures or configurations for the enterprise communications system 14 will be appreciated by those ordinarily skilled in the art. For example, in example embodiments the service management platform 18 can be separate from the PBX 16; or the service management platform 18 can include a cloud-based system.

Figure 5:
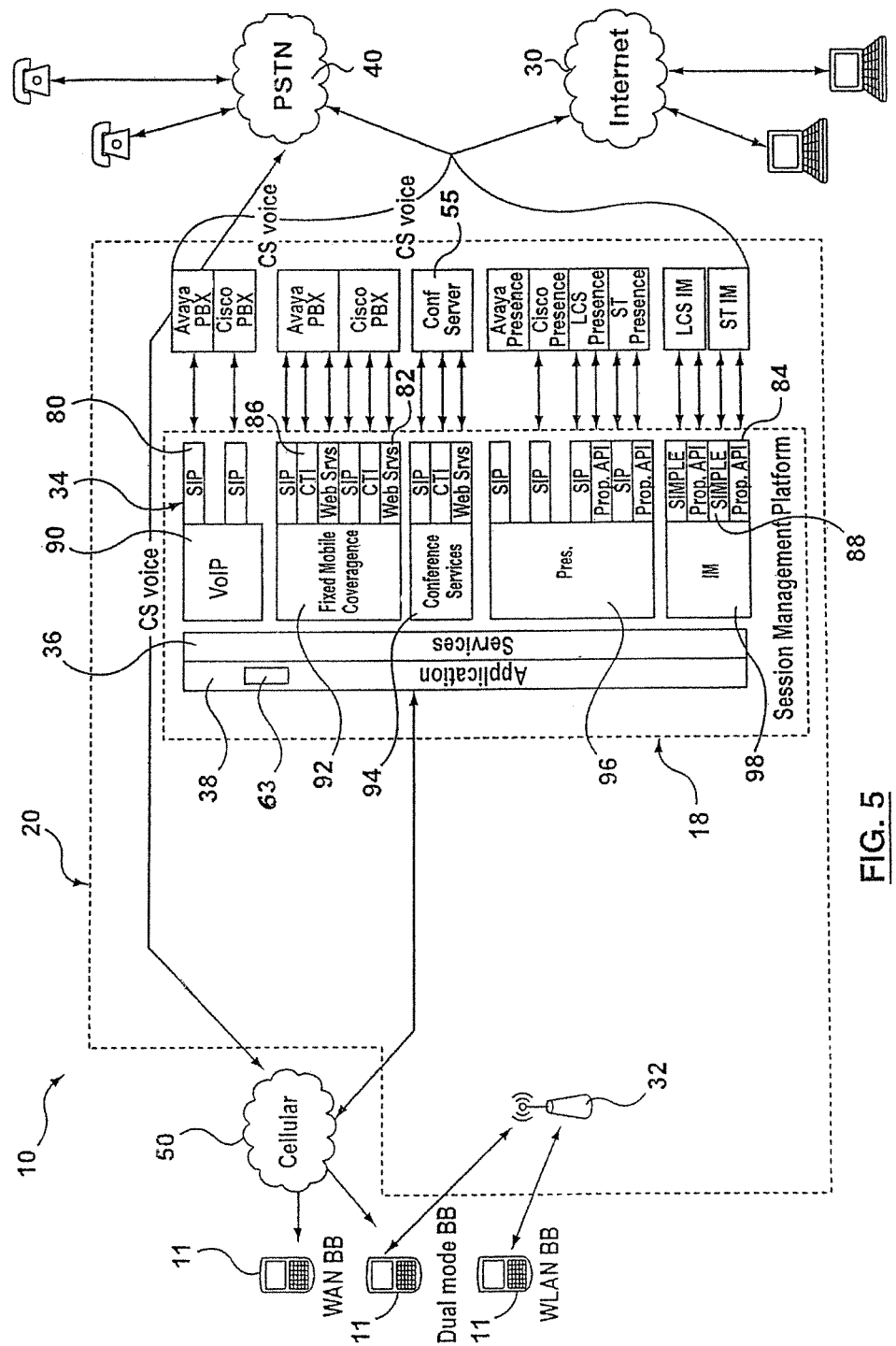
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

Although SIP 80 can be utilized, it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service can use the VoIP or PBX enabler, and an emergency response application can use the phone call service, an Instant Messenger service, a video call service, and email service and/or a conference service.

The application layer 38 can include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data can be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Example conference call systems and methods in accordance with example embodiments will now be described, referring now to FIG. 6, which shows the system 10 when used or configured as a conference call system. As shown, the enterprise communications platform 14 includes the conference server 55 for providing conference call services for a number of client devices such as mobile devices 11, illustrated as one designated host device 11a and one or more participant devices 11b, 11c, 11d. The mobile devices 11 can collectively form a conference call group. The host device 11a is generally the mobile device 11 or associated user who schedules and hosts a conference call session, and can for example be permitted to perform such hosting functions as roll call, mute all, broadcast only, conference lock, etc. In some example embodiments, the conference call session cannot commence without the presence of the host device 11a.

The enterprise communications platform 14 and the associated conference server 55 can be used for generally executing conference call functions. As described above, in example embodiments, the enterprise communications platform 14 can include or be coupled to the media server 76 (FIG. 4), wherein the enterprise communications platform 14 controls the media handling and media sessions of the media server 76.

Figure 6:
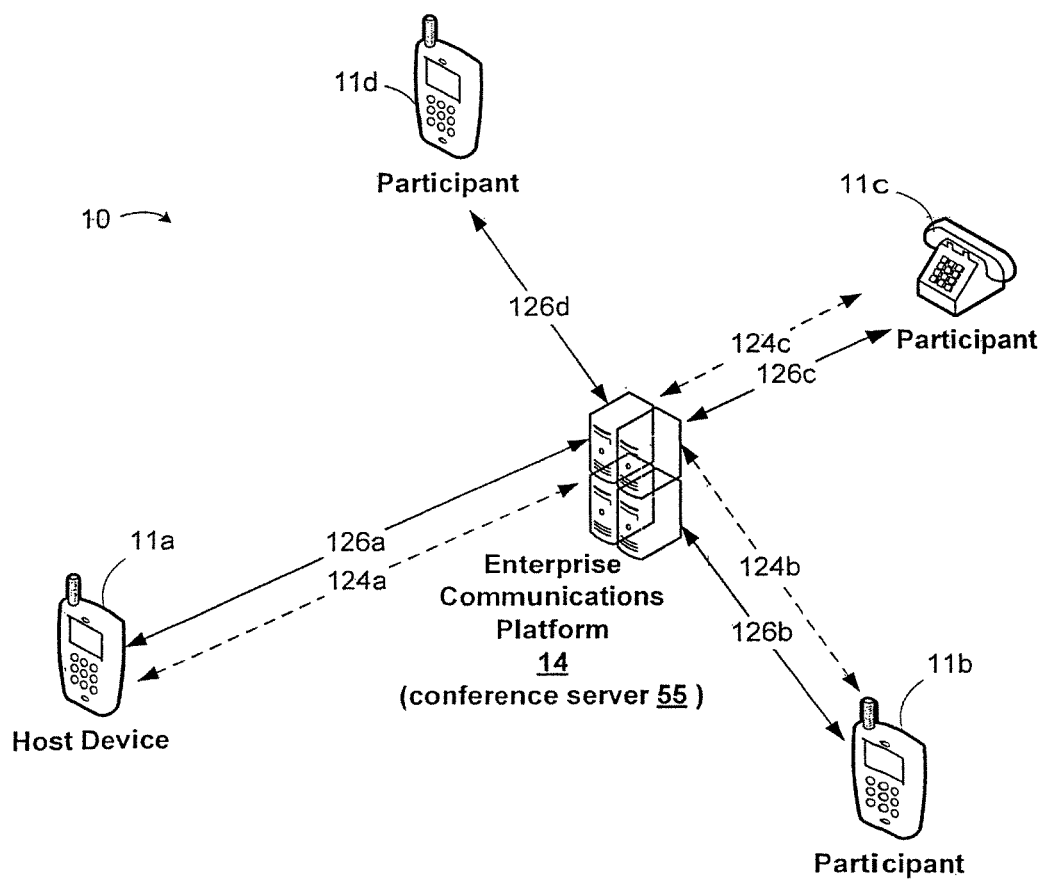
FIG. 6 shows, in block diagram form, a conference call system including the enterprise communications platform shown in FIG. 1 and client devices.

Referring still to FIG. 6, in order to implement some of the conference call functions described herein, the enterprise communications platform 14 can communicate with the mobile devices 11 by way of media sessions and/or control sessions. Specifically, as shown in FIG. 6, the mobile devices 11 communicates via media sessions 126 (shown as solid lines) and control sessions 124 (shown as dashed lines to distinguish from the media sessions 126). For example, the designated host device 11a communicates via media session 126a and control session 124a. Participant device lib communicates via media session 126b and control session 124b. Participant device 11c communicates via media session 126c and control session 124c. In some embodiments, as shown, the participant device 11d can merely communicate via media session 126d over the PLMN 50 (FIG. 1) or PSTN 40 (FIG. 1) only (without an associated control session).

In some example embodiments, the media sessions 126 can be facilitated by the enterprise communications platform 14 by way of Real-time Transport Protocol (RTP) media sessions, and can include voice calls, video calls, circuit-switched calls or VoIP calls. In order to generate or establish a conference call session, the enterprise communications platform 14 couples or links at least some of the call legs of each media session 126. The particular methods and processes for connecting of media sessions 126 into a conference call session would be understood by those skilled in the art, which can for example be implemented by media shuffling or SDP (Session Description Protocol) media shuffling, etc.

In some example embodiments, a data connection (e.g. the same data connection as used by the control sessions 124) can be further used to provide additional data sharing between mobile devices 11. For example, during a conference call, the host mobile device 11a can provide or transfer a data file to the remaining mobile devices 11. Data sharing can also include Web Services or sharing of presentation content.

In some example embodiments, during a conference call session, the enterprise communications platform 14 can receive Global Positioning System (GPS) information from at least some of the participant devices 11, and can send the received GPS information to the devices 11, to provide location based positioning services between the devices 11.

Figure 7:
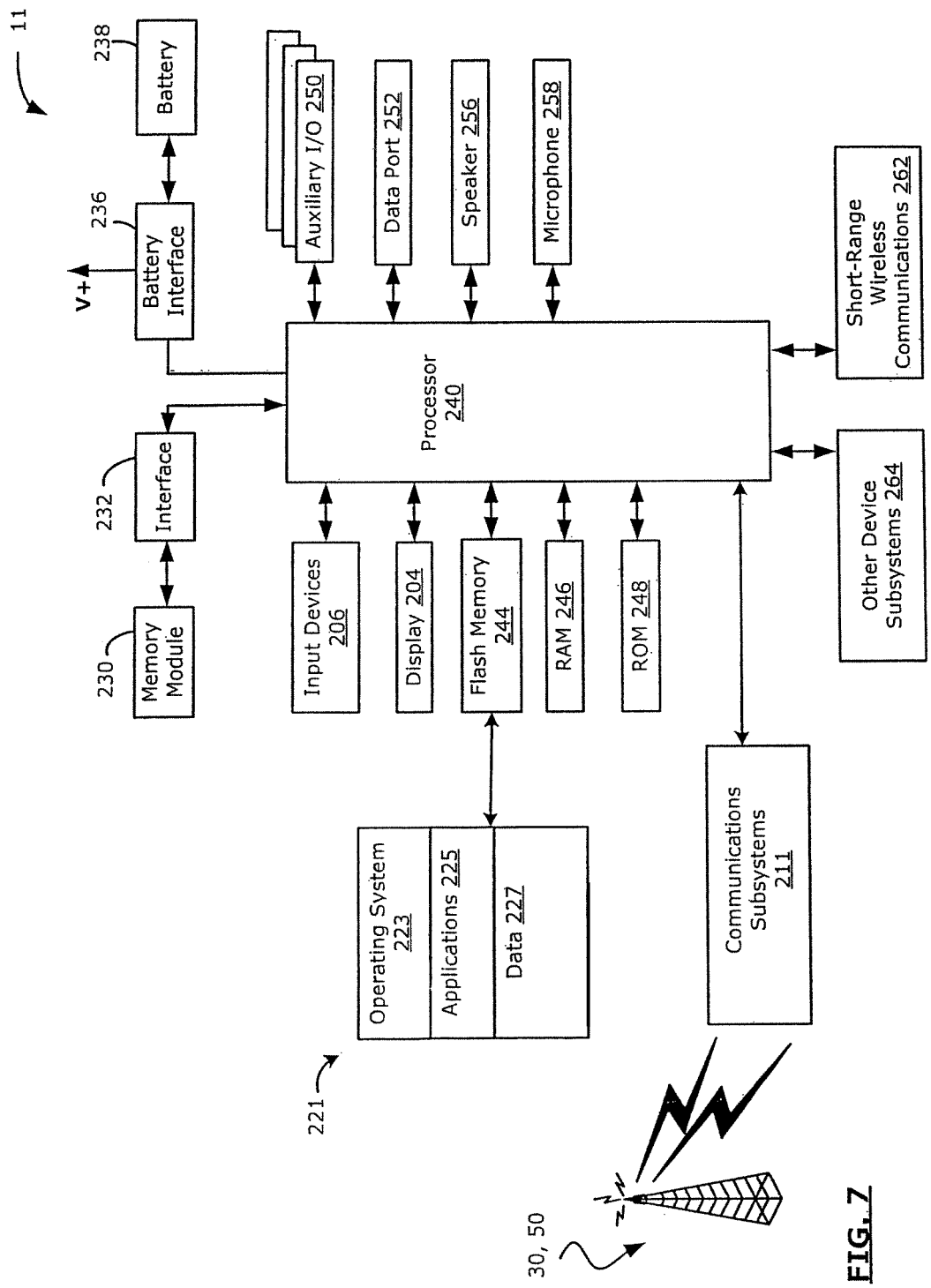
FIG. 7 shows a block diagram illustrating a mobile communication device in accordance with an example embodiment.

Reference is now made to FIG. 7 which illustrates in detail a mobile device 11 in which example embodiments can be applied. The mobile device 11 is a two-way communication device having data and voice communication capabilities, and the capability to communicate with other computer systems, for example, via the Internet. Depending on the functionality provided by the mobile device 11, in various embodiments the mobile device 11 can be a handheld device, a multiple-mode communication device configured for both data and voice communication, a smartphone, a mobile telephone or a PDA (personal digital assistant) enabled for wireless communication.

The mobile device 11 includes a rigid case (not shown) housing the components of the mobile device 11. The internal components of the mobile device 11 can, for example, be constructed on a printed circuit board (PCB). The description of the mobile device 11 herein mentions a number of specific components and subsystems. Although these components and subsystems can be realized as discrete elements, the functions of the components and subsystems can also be realized by integrating, combining, or packaging one or more elements in any suitable fashion. The mobile device 11 includes a controller comprising at least one processor 240 (such as a microprocessor) which controls the overall operation of the mobile device 11. The processor 240 interacts with device subsystems such as a wireless communication subsystem 211 for exchanging radio frequency signals with the wireless network (e.g. WAN 30 and/or PLMN 50) to perform communication functions. The processor 240 interacts with additional device subsystems including a display 204 such as a liquid crystal display (LCD) screen or any other appropriate display, input devices 206 such as a keyboard and control buttons, persistent memory (such as Flash Memory) 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which can employ any appropriate wireless (e.g., RF), optical, or other short range communications technology), and other device subsystems generally designated as 264. Some of the subsystems shown in FIG. 7 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 30 and wireless LAN access points 32 within the wireless network. The particular design of the wireless communication subsystem 211 depends on the wireless network in which mobile device 11 is intended to operate. The mobile device 11 can send and receive communication signals over the wireless network after the required network registration or activation procedures have been completed.

The processor 240 operates under stored program control and executes software modules 221 stored in memory such as persistent memory 244 or ROM 248. The processor 240 can execute code means or instructions. ROM 248 can contain data, program instructions or both. Persistent memory 244 can contain data, program instructions or both, in some embodiments is rewritable under control of processor 240, and can be realized using any appropriate persistent memory technology, including EEPROM, EAROM, FLASH, and the like. As illustrated in FIG. 7, the software modules 221 comprise operating system software 223 and software applications 225.

Software modules 221 or parts thereof can be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 can further include a range of applications, including, for example, an e-mail messaging application, address book, calendar application, notepad application, Internet browser application, voice communication (i.e., telephony) application, mapping application, or a media player application, or any combination thereof. Each of the software applications 225 can include layout information defining the placement of particular fields and graphic elements (e.g., text fields, input fields, icons, etc.) in the user interface (i.e., the display 204) according to the application.

The modules 221 can further include a Global Positioning System (GPS) module or application which is configured for detection of a geographical position of the device 11, for example by correlating existing satellites. The GPS module can also receive from the enterprise communications platform 14 the geographical positions of the other devices 11.

In some embodiments, the auxiliary input/output (I/O) subsystems 250 can comprise an external communication link or interface, for example, an Ethernet connection. The auxiliary I/O subsystems 250 can further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 11 (e.g., receipt of an electronic message or incoming phone call), or for other purposes such as haptic feedback (touch feedback).

In some embodiments, the mobile device 11 also includes one or more removable memory modules 230 (typically comprising FLASH memory) and one ore more memory module interfaces 232. Among possible functions of the removable memory module 230 is to store information used to identify or authenticate a user or the user's account to wireless network (e.g. WAN 30 and/or PLMN 50). For example, in conjunction with certain types of wireless networks, including GSM and successor networks, the removable memory module 230 is referred to as a Subscriber Identity Module or SIM. The memory module 230 is inserted in or coupled to the memory module interface 232 of the mobile device 11 in order to operate in conjunction with the wireless network.

The mobile device 11 stores data 227 in a persistent memory 244. In various embodiments, the data 227 includes service data comprising information required by the mobile device 11 to establish and maintain communication with the wireless network (e.g. WAN 30 and/or PLMN 50). The data 227 can also include, for example, scheduling and connection information for connecting to a scheduled conference call.

The mobile device 11 also includes a battery 238 which furnishes energy for operating the mobile device 11. The battery can be coupled to the electrical circuitry of mobile device 11 through a battery interface 236, which can manage such functions as charging the battery from an external power source (not shown) and the distribution of energy to various loads within or coupled to the mobile device 11. Short-range communication subsystem 262 is an additional optional component which provides for communication between the mobile device 11 and different systems or devices, which need not necessarily be similar devices. For example, the short-range communication subsystem 262 can include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 11 during or after manufacture. Additional applications and/or upgrades to the operating system software 223 or software applications 225 can also be loaded onto the mobile device 11 through the wireless network (e.g. WAN 30 and/or PLMN 50), the auxiliary I/O subsystem 250, the data port 252, the short-range communication subsystem 262, or other suitable subsystem such as 264. The downloaded programs or code modules can be permanently installed, for example, written into the program memory (e.g., the persistent memory 244), or written into and executed from the RAM 246 for execution by the processor 240 at runtime.

The mobile device 11 can provide three principal modes of communication: a data communication mode, an optional voice communication mode and an optional video communication mode. In the data communication mode, a received data signal such as a text message, an e-mail message, a downloaded Web page, or an image file will be processed by the wireless communication subsystem 211 and input to the processor 240 for further processing. For example, a downloaded Web page can be further processed by a browser application or an e-mail message can be processed by an e-mail message messaging application and output to the display 204. A user of the mobile device 11 can also compose data items, such as e-mail messages, for example, using the input devices in conjunction with the display 204. These composed items can be transmitted through the wireless communication subsystem 211 over the wireless network (e.g. WAN 30 and/or PLMN 50). In the voice communication mode, the mobile device 11 provides telephony functions and operates as a typical cellular phone. In the video communication mode, the mobile device 11 provides transcribing functions during a video conferencing session, including at least one camera.

Figure 13:
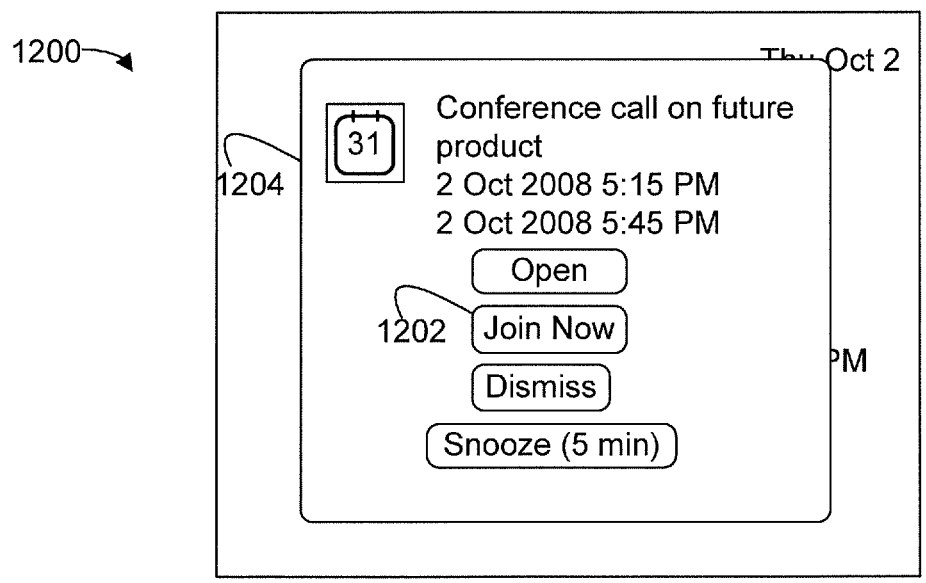
FIG. 13 shows a reminder interface for a scheduled conference call session, in accordance with an example embodiment.

Reference is now briefly made to FIG. 13, which shows a reminder interface 1200 which is displayed on the device 11 at a time of a conference call session, or a specified time beforehand. In some example embodiments, the conference call application can include a join now feature. In some example embodiments, the join now feature includes a default join option, shown as a "Join Now" button 1202, for establishing the scheduled conference call session using a default address. Once the time of that meeting arrives, or a predetermined time beforehand, the "Join Now" button 1202 can be displayed on the device 11 on a popup reminder interface

1204. In example embodiments, the automatic discovery feature is used to determine whether a particular address is to be associated with the join now feature. When this is performed, the selection of the "Join Now" button 1202 would result in the device 11 automatically coupling to the enterprise communications platform 14 using the identified address. The address can be a phone number and conference access code, or an address link such as an Internet address.

In some existing systems, a conventional join now feature requires specific conference tags in order to identify that a particular phone number is to be allocated for the join now feature. A participant who receives such a meeting invitation would typically be required to use the same or a compatible software application in order to read the conference tags, to read and store the relevant conference details from those tags. A limitation with these existing systems is that the join now feature appears only after the tags are inserted by the user into a meeting invite. For example, if a meeting invite was created via Microsoft Outlook™, the "Join Now" button will typically be absent or inactive unless a special application is used to manually insert the appropriate conference tags.

Referring again to FIGS. 6 and 7, the applications 225 can include a conference call application, which can be an add-on, plug-in or app for a calendar application. Generally, in some example embodiments, the conference call application can be used for identifying whether a calendar event record, such as a meeting request, is in relation to a scheduled conference call. Some example embodiments generally relate to an automatic discovery feature with respect to the calendar event record. Example embodiments can parse the calendar event record to identify any conference call scheduling information. When parsing, some of the calendar event record can be temporarily stored in a cache in the memory.

Some example embodiments can be implemented by a host communication device 11a for a conference call. A conference call record can be automatically populated with keywords when it intelligently recognizes a user's desire to convene a conference call session from a new or existing calendar meeting entry. Additionally, the conference call can be set up from a mobile communication device so as not to require a user to log onto their desktop to coordinate specific details.

Some example embodiments can be implemented by a non-host participant communication device for a conference call. This can be applied to a calendar meeting that is received, or to existing stored calendar meetings. The calendar meeting can be identified as being in relation to a conference call, and address information such as dialing or link information can be identified and used to join the conference call at or before the time of the call.

In some example embodiments, the conference call application can be configured for: parsing at least some of the calendar event record; determining, based on the parsing, whether the calendar event record includes conference call scheduling information in relation to a scheduled conference call session; generating, based on the parsing, one or more identifiers for at least some of the conference call scheduling information; and storing in the memory 244 the one or more identifiers. In some example embodiments, the conference call scheduling information can include a conference dialing number and a passcode or pin number. In some example embodiments, the conference call scheduling information can include an extra meeting identification number (meeting ID). The parsing operation can distinguish the conference dialing number, the passcode, the pin number, the meeting identification number, or any combination thereof from the other information in the calendar event record. For example, the parsing operation can distinguish the passcode from the pin number.

The one or more identifiers can include tags or fields. The identifiers can be stored as a separate record or along with a copy of corresponding conference call scheduling information. In another example embodiment, the tags are used to tag corresponding conference call scheduling information within the calendar event record itself.

Some example embodiments can support multiple addresses, such as multiple phone numbers and/or address links. For example, each of the multiple addresses can terminate onto the enterprise communications platform 14. The automatic discovery feature can be used to determine which address is to be allocated for the join now option.

The automatic discovery feature for parsing the calendar event record will now be described in greater detail. In some example embodiments, the automatic discovery feature does not merely rely on tags or fields for identifying the conference call scheduling information. In some example embodiments, a trigger event such as the initial installation of the conference call application, will cause every meeting event contained in the calendar to be parsed. Other triggers can also be used, such as each launching of the conference call application or waiting a periodic time period. During this phase, in other example embodiments, only calendar event records from the current time to the future are parsed, wherein any past events are ignored. After the initial installation, going forward, the application can parse any calendar event record whenever a new event is added to the calendar application, such as when a new event is generated by the user using the calendar application, or a calendar event record is received or sent as an invitation message.

In an example embodiment, the automatic discovery uses feature-based learning. This uses and acquires a large sample of both meetings that contain conference details and meetings that do not, and from this sample, extracts the features that strongly indicate whether a meeting is a teleconference or not. This approach uses a sample set that accurately represents real-world data to have a high degree of confidence in its accuracy. Example implementations can be analogous to spam detection, such as Bayesian spam detection, as would be understood in the art. Examples of such detection can include, for example, Ion Androutsopoulos et al., September 2000, "Learning to Filter Spam E-Mail: A Comparison of a Naive Bayesian and a Memory-Based Approach," Dept. of Informatics, University of Athens; and M. Sahami et al. (1998), "A Bayesian approach to filtering junk e-mail," AAAI'98 Workshop on Learning for Text Categorization, the contents of which are herein incorporated by reference.

This approach has a relatively proven track record of extremely high accuracy for problems like spam filtering, but is also suitable for automatic discovery of particulars of a conference call with minimal parsing.

In another example embodiment, the automatically discovery feature uses a whitelist of keywords. This can include sampling a whitelist of keywords to automatically discover teleconference meetings. This can include collecting over a hundred samples of teleconference meetings from over ten example participants and determining common formats meeting organizers use when putting in conference details. This can also include sampling default templates that are automatically inserted into meeting invitations when using different teleconference vendors. Example teleconference vendors include, without intending to be limiting, InterCall, WebEx, ACT, Live Meeting, and e-Dial. Conference related keywords can also be used based on commonly used terms for teleconference meetings.

This approach is advantageous in that misclassifications of meetings can often be fixed by adding new keywords or formats to the whitelist. This approach can also provide support of specific well-known formats or templates.

In another example embodiment, the automatically discovery feature uses reinforcement learning. In some example embodiments, this approach is not necessarily an alternative to the other approaches, but rather an enhancement to be used in conjunction with either approach. This approach includes using a simplified version of reinforcement learning to improve accuracy on a per user basis. Reinforcement learning, unlike feature-based learning, is done after the conference call application is installed on a device. In this approach, the application, once installed, improves its accuracy over time by learning from past misclassifications of conference meetings. In this approach, the application explicitly asks or prompts the user whether or not the application correctly labelled a meeting as a teleconference meeting and accurately identified the conference details. The accuracy of automatic discovery improves over time in this approach.

Figure 9:
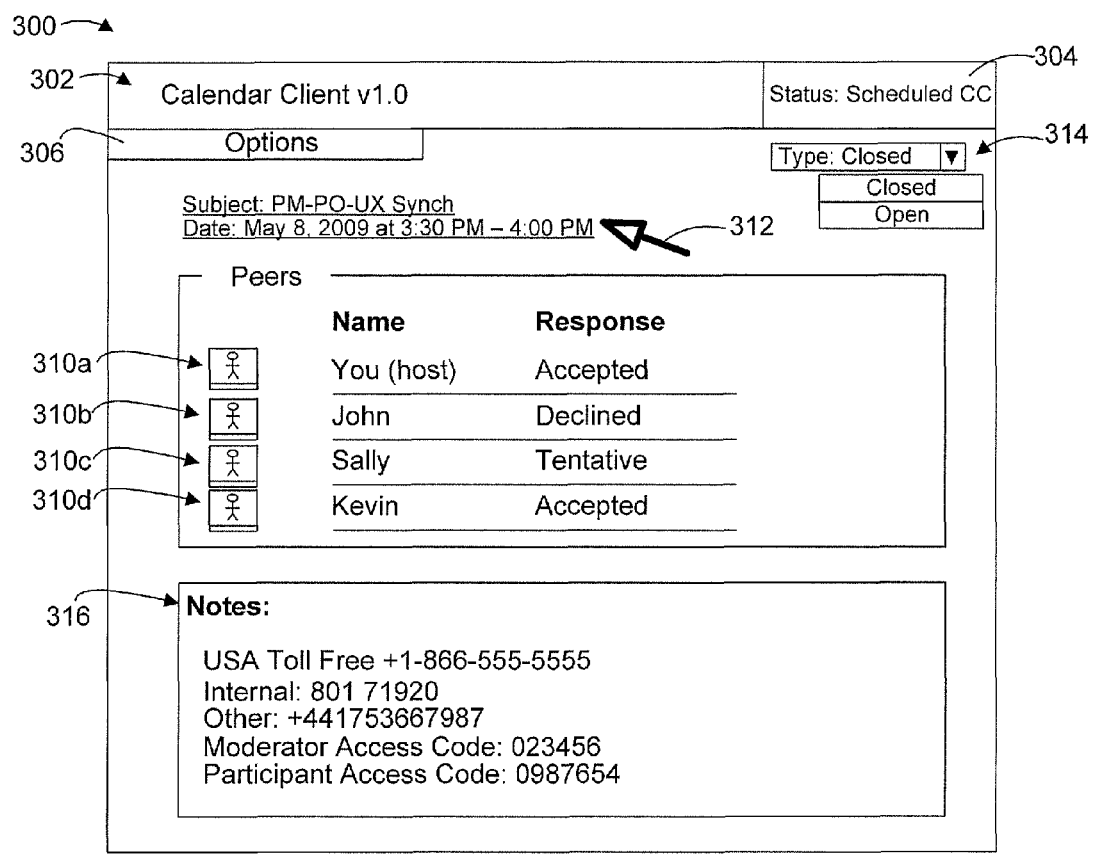
FIG. 9 shows a user interface as displayed on a mobile communication device, for scheduling of a calendar meeting for a conference call, in accordance with an example embodiment.

Reference is now made to FIG. 9, which shows an example user interface 300 displayed on the display 204 for scheduling a conference call, in accordance with an example embodiment. In the example embodiment shown, the user interface 300 is for example implemented by a conference call application (as a stand-alone or in combination with other applications) resident on the host device 11a, which can be an add-on, plug-in or app for a calendar application. The user interface 300 can form part of a conference call session scheduling process.

Still referring to FIG. 9, the user interface 300 relates to scheduling of a conference call session having a subject and which is to occur at a scheduled time and date. For example, the time and date of the scheduled conference call session can be stored within the conference call application or a calendar application. For example, the scheduled conference call has a subject field of "PM-PO-UX Synch." and has a scheduled date field of "May 8, 2009 at 3:30 PM-4:00 PM." The user interface 300 can be manually triggered by launching and subsequently operating the conference call application.

As shown in FIG. 9, the user interface 300 also includes an options menu 306 to perform functions such as editing the existing scheduled conference call, scheduling new conference calls, and inviting new participants. During the conference call scheduling process, the conference call scheduling information is sent from the host device 11a to the enterprise communications platform 14, which stores the information in a memory. In some example embodiments, the host mobile device 11a sends an invitation message directly or indirectly to the recipient invitee client devices 11. In some example embodiments, the host mobile device 11a receives a response to the invitation message directly or indirectly from the invitee client devices 11. The host mobile device 11a can update the enterprise communications platform 14 in such example embodiments.

At the time of the scheduled conference call, or a specified time beforehand, the enterprise communications platform 14 can contact each of the devices 11 to join the media sessions together. In example embodiments, the devices 11 can also dial or link into the enterprise communications platform 14 using dialing or address link information received during scheduling.

As shown in FIG. 9, the user interface 300 includes a title bar 302, a status icon 304, an options menu 306, and participant icons 310a-310d (each or individually 310) which display the status of each participant for the conference call. The participant icons 310 can, for example, be a photo or avatar of the individual user. A cursor 312 is also shown for indicating which item(s) on the user interface 300 are to be selected (e.g., controllable by a user input device such as a touchscreen, touch scrollball or mouse). The status icon 304 displays the present status of the conference call, for example "Scheduled CC" (Conference Call) as shown.

Referring now to the participant icons 310, in the example shown, the user interface 300 is displayed on the host device 11a, indicated as "You—Host" as shown in icon 310a. The participant icon 310b associated with "John" is indicated as "Declined." The participant icon 310b associated with "Sally" is indicated as "Tentative." The participant icon 310d associated with "Kevin" is indicated as "Accepted." Contact information such as e-mail address or phone number for the participants can be pre-stored in association with the participant names (or can be manually entered, as appropriate). The status of each participant icon 310 can also be shown, for example, as Accepted, Tentative, or Declined.

As shown in FIG. 9, in some example embodiments the host device 11a can also select a menu 314 to designate the scheduled conference call as a "closed" conference call. In a "closed" call, only the specified or eligible participant devices 11 designated by the host device 11a can join the call. Additionally, for example, only a specified number of participants can join the call. In some example embodiments, in a "closed" call further authentication of those participant devices 11 can be performed when attempting to access the scheduled conference call. As shown, the host device 11a also has the option to use the menu 314 to set the scheduled conference call as an "open" conference call, wherein any participant device 11 (designated as eligible or not) can join.

In some example embodiments, some aspects of the user interface 300 can relate to a conventional calendar event scheduling interface. For example, a user can populate a Notes Graphic User Interface (GUI) 316 as normally performed when scheduling a conference call using a conventional calendar event scheduling interface. In some example embodiments, the Notes GUI 316 can be filled with various information or comments with respect to the meeting, and whether the meeting is in relation to a conference call. In some example embodiments, Notes GUI 316 can be populated with one or more phone numbers, and moderator or participant access codes, for operatively connecting to the enterprise communications platform 14. In the example shown, the phone numbers shown are USA Toll Free, Internal extension, and Other. Additional addresses can also be populated within the Notes GUI 316, such as an Internet, Intranet, or SIP address link.

Accordingly, some example embodiments can support multiple addresses, such as multiple phone numbers and/or address links. Through the interface 300, the host user can save the calendar invitation as a calendar event record, or send the present calendar invitation to the invitees. This can trigger the automatic discovery feature in accordance with some example embodiments, as described above. Using the automatic discovery feature, one or a plurality of addresses can be identified from the calendar event record, for example from the Notes GUI 316. In some example embodiments, using the interface, users can choose from a list which phone number they would like to use for the join now button 1202 (shown in FIG. 13). The interface can be accessible from the calendar meeting event record, to allow the user to modify which number is to be used for the join now button 1202 (shown in FIG. 13) to dial into the conference call.

Figure 10:
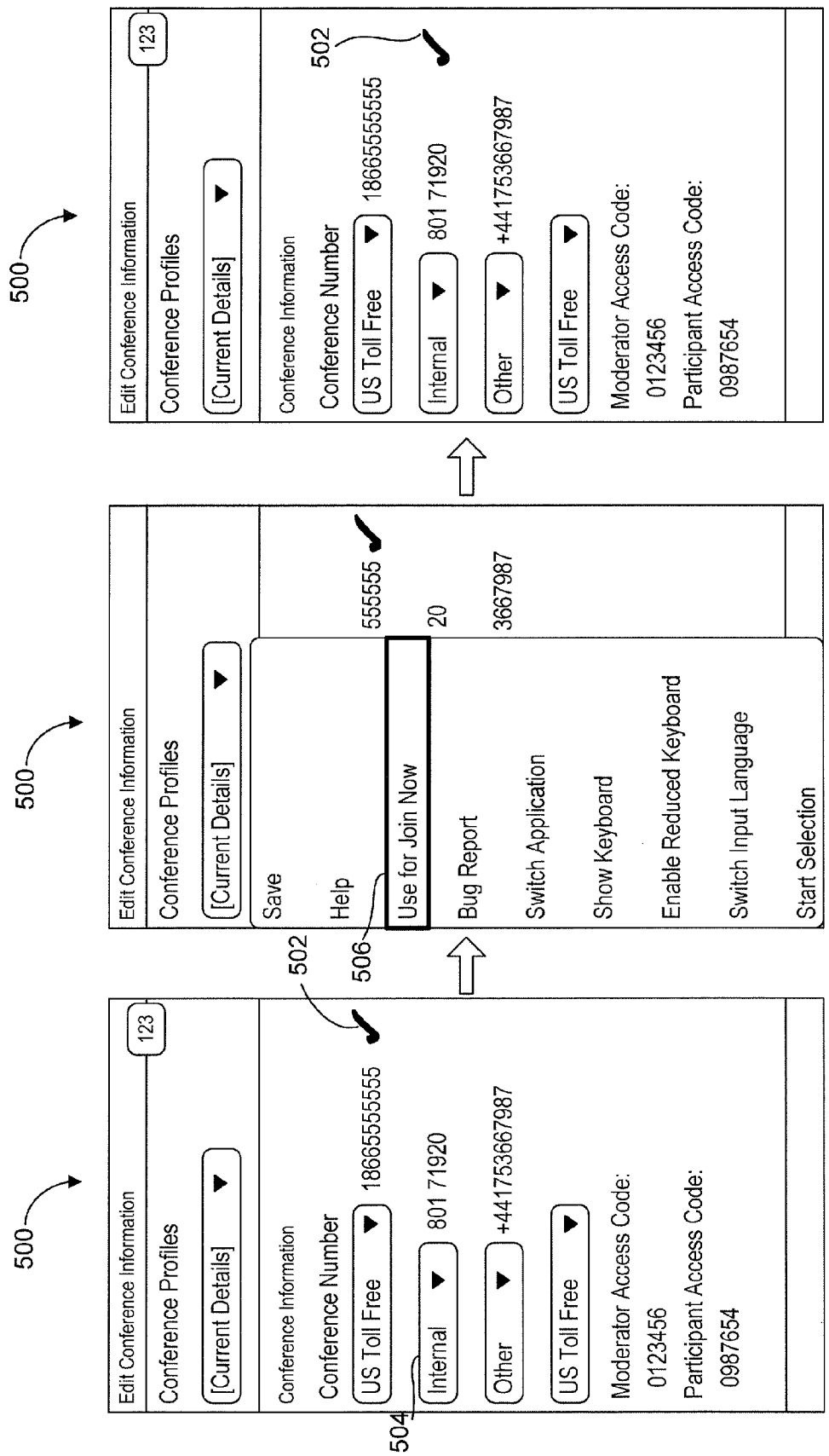
FIG. 10A shows an example user interface for configuring conference call scheduling information, in accordance with an example embodiment.
FIG. 10B shows the example user interface of FIG. 10A in another operation.
FIG. 10C shows the example user interface of FIG. 10A in another operation.

Reference is now made to FIG. 10A, which shows an interface 500 in accordance with an example embodiment. As illustrated in the interface 500, the automatic discovery feature can be used to extract the various conference call scheduling information from the Notes GUI 316 (shown in FIG. 9). As shown, the US Toll Free, Internal, Other, Moderator Access Code, and Participant Access Code are automatic discovered and copied into respective fields. The host device 11a can also store a tag, represented by checkmark 502, which represent the particular phone number (US Toll Free in this example) which is the default phone number assigned to the join now option (e.g. join now button 1202 (shown in FIG. 13)). Through the interface 500, the user can edit or select which address or phone number is to be used for the join now option.

Thus, reference is made to FIGS. 10B and 10C, which illustrate how the interface 500 can be used to select a different phone number, for example Internal, as the default phone number assigned to the join now option. As shown in FIGS. 10A and 10B, a drop-down menu 504 for Internal is selected, and the "Use for Join Now" option 506 can be selected. As shown in FIG. 10C, the tag, represented by checkmark 502, is now assigned to the Internal phone number.

In further example embodiments, a tag is saved or flagged within the Notes GUI 316 itself (shown in FIG. 9), for example using an XML tag or other indicator (not shown).

Accordingly, the host device 11a can readily use natural language to create and configure a conference call meeting for sending to other devices, which can recognize the same fields or tags.

Figure 11:
FIG. 11 shows another example user interface for configuring conference call scheduling information, in accordance with another example embodiment.

Reference is now made to FIG. 11, which shows another interface 600 in accordance with another example embodiment. As illustrated in the interface 600, the automatic discovery feature can be used to extract the various conference call scheduling information from the Notes GUI 316 (shown in FIG. 9). The default phone number assigned to the join now option (e.g. join now button 606) can be selected using a drop-down menu 604. Through the interface 600, the user can edit or select which address or phone number is to be used for the join now button 606. As shown in FIG. 11, a tag, represented by checkmark 602, is assigned to the phone number to be used for the join now button 606.

Figure 12:
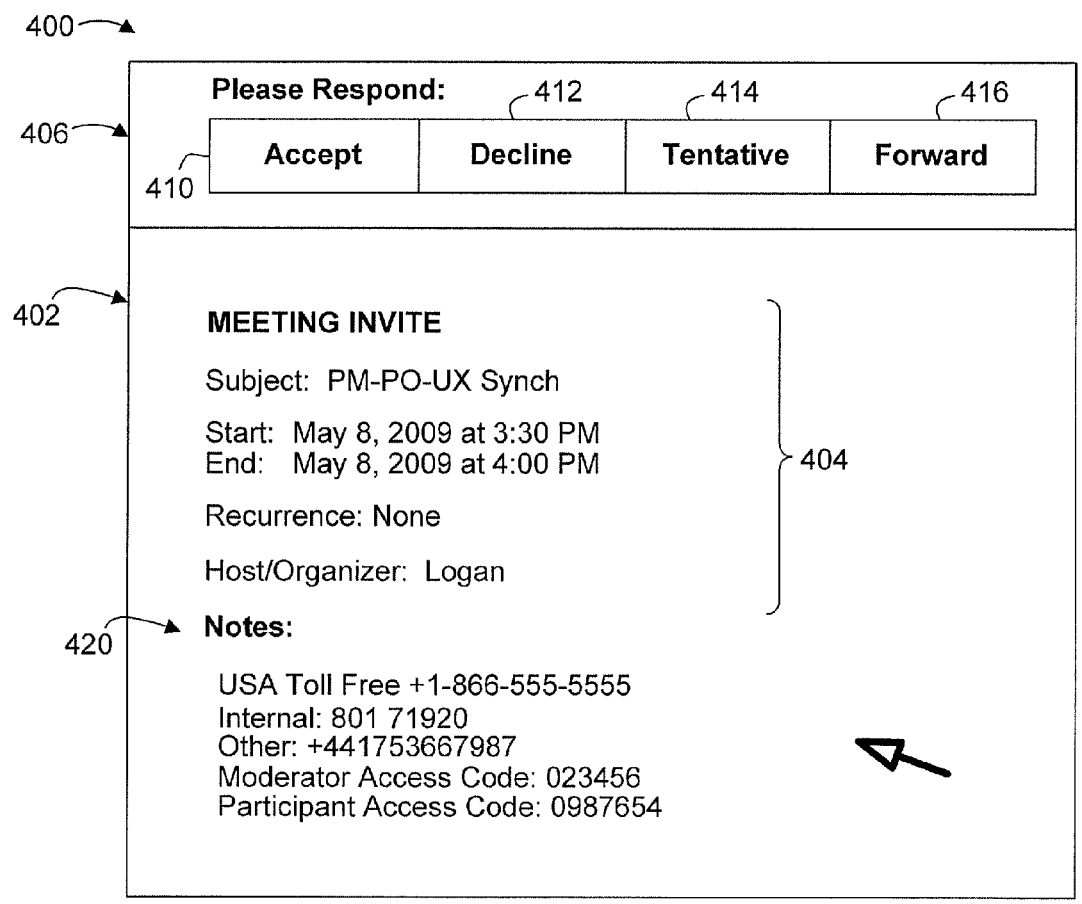
FIG. 12 shows an example user interface for displaying a received invitation message on a mobile communication device, in accordance with an example embodiment.

Reference is now made to FIG. 12, which shows a user interface 400 for displaying a received invitation message 402 on a non-host participant device 11. In some example embodiments, the received invitation message 402 can be received from any formatted calendar source, such as, without intending to be limiting, Google™ Calendar, Apple™ iCal, GoDaddy™ Online Group Calendar, IBM Lotus Notes™, Yahoo™ Calendar, Microsoft Outlook™, or any calendar standard format such as ICalendar (*.ics), as would be understood in the art. The device 11 first receives the invitation message 402 from another communication device, such as host device 11a, with respect to a scheduled conference call (and not necessarily having the same conference call application installed). As shown, the message 402 as displayed can include a number of fields 404 which relate to conference call scheduling information. The fields 404 include Subject, Start time, End time, Recurrence, Host/Organizer, and Notes 420. The Notes 420 can include a variety of notes on the conference call scheduling information, such as web information or audio (dialing) information for accessing the conference call. In some example embodiments, the example user interface 400 can be displayed using a calendar application or a conference calling add-on, plug-in or app, as a stand-alone or in combination with other applications. The user interface 400 can also form part of the conference call session scheduling process.

In some example embodiments, the invitation message 402 can be received as an e-mail message designating the participant's e-mail address, but can also be in other forms such as short message service (SMS), SIP message, instant messaging, or calendar invite. The message 402 can be received directly or indirectly from a host device 11a.

As shown on the interface 400, a number of response options 406 can be selected in order to respond to the invitation message 402. As shown, the response options 406 include Accept 410, Decline 412, Tentative 414, or Forward 416. Upon selection of one or more of the response options 406, a communication containing the response is sent to the host device 11a. In further example embodiments, selection of the Accept 410 option can result in the details of the invitation message 402 being stored in a calendar application of the device 11. The Forward 416 option can be used to forward the invitation message to a new participant client device.

Upon receiving the invitation message 402, this can trigger the automatic discovery feature in accordance with some example embodiments, as described above. Using the automatic discovery feature, conference call scheduling information such as one or a plurality of addresses can be identified from the calendar event record. Other triggers can be used, such as selecting the Accept 410 option or saving the invitation message 402. The automatic discovery feature identifies and/or extracts the relevant conference call scheduling information, such as the various phone numbers contained in the Notes 420. In addition, one of the numbers can be automatically selected as the default number to be used for the join now option.

Referring again to FIG. 10A to 10C, in some example embodiments, the interface 500 can be used by a non-host participant device 11 (the same interface 500 used by the host device 11a is illustrated here for convenience). Through the interface 500, invited users can select from a list which phone number they would like to use for the join now button 1202 (shown in FIG. 13), for example, if the automatically selected default number or address is not suitable. The interface can be accessible from the calendar meeting event record, to allow the user to modify which number is to be used for the join now button 1202 (shown in FIG. 13) to dial into the conference call. Note that, this is typically configured prior to the occurrence of the conference call, so that the user is not rushed at the scheduled time. At the time of the scheduled conference call, or a specified time beforehand, the devices 11 can display the reminder interface 1200 including the join now button 1202 (shown in FIG. 13), to dial or link into the enterprise communications platform 14.

Referring briefly to FIG. 11, the alternate interface 600 can also be used for editing and configuring the conference call scheduling information for the non-host participant device. For example, the address associated with the join now button 606 can be configured using the drop-down menu 604.

Referring again to the interface 400 of FIG. 12, if web information is received, an address link (not shown) can be selected as the default join option for joining the conference call session. If the conference call is a closed call, the enterprise communications platform 14 can then authenticate the device 11, for example by authenticating an identifier of the device 11 (in one embodiment, using a particular persistent device identifier). Upon authentication, a conference call session can be established between the device 11 and the enterprise communications platform 14, which can include a media session 126 (shown in FIG. 6).

As can be appreciated, in some example embodiments the address link can identify the enterprise communications platform 14 as well as the scheduled conference call session and/or the participant identifier, and can include a Uniform Resource Locator (URL), a Uniform Resource Identifier (URI), or other suitable address.

Referring again to FIGS. 10A to 10C, the particular automatic discovery and selection of the default address or phone number for the join now option from a plurality of addresses will now be described. For example, a user can use their device in different ways. They can make personal calls through their personal cell line. They can join office calls or contact clients or colleagues through their work number. When making a conference call, it is necessary to select the appropriate number and configure the appropriate connection. A user can be authorized to make a call if they were at their desk, but their personal cell line does not have permission to join a secure call. However the user is in fact the same individual but the device and the bridge do not know this.

Referring still to FIGS. 10A to 10C, the interface 500 can be displayed on either the host device 11a or the non-host participant device 11, as appropriate. In some example embodiments, localization or location information is used to determine the default phone number for the particular client device. For example, a local phone number can be used if the device is associated with a particular location. For example, the particular carrier subscriber of the device can be used to determine the geographic location. In some example embodiments, a phone number of an associated SIM card or CDMA card can be used to determine the best suited location, and therefore the most suitable address, of the device. For example, the Mobile Station International Subscriber Directory Number (MSISDN) of the device can be used.

In some example embodiments, GPS information from the GPS application can be used to determine the present location of the device, and whether a local number is available or suitable for the join now option.

In some example embodiments, other future calendar event records can be used to determine where the device will be located for a future meeting. For example, if a user based in London is travelling to New York City, the device can determine the user's current or anticipated (scheduled) location. Based on the user current or anticipated location, the more preferred dial-in information can be used to connect to the conference, for example whatever local dialing number is available. If no local dialing number is available, then the toll free number can be selected as the default number.

In some example embodiments, the security designation or permissions of the particular device is considered for selection of the default address for the join now option from the plurality of addresses. For example, from a work desktop phone, that phone can be permitted to dial an internal extension ("Internal" shown in FIG. 10A), however a personal mobile device may not have some such permission. In another example, mobile phones which are associated with a particular enterprise can be permitted to access the conference via an address link (not shown), and can thus automatically select the address link as the default join option.

If only one address or phone number is received in the original invitation message, then that address or phone number is automatically assigned as the default join option.

Accordingly, various specified criteria can be used to determine the default phone number. These various criteria can be prioritized or weighted, as appropriate. For example, the automatic discovery feature can be used.

Figure 8:
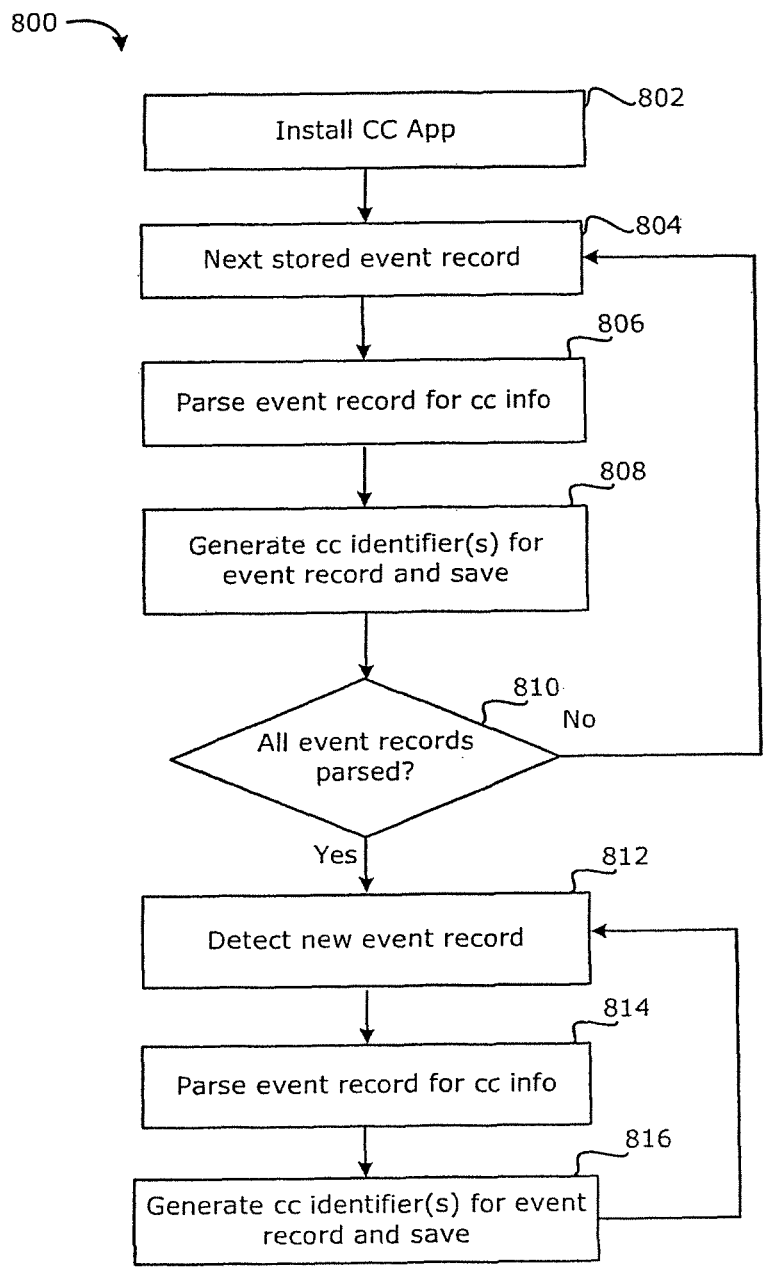
FIG. 8 shows an example flow diagram of a method for identifying a conference call in accordance with an example embodiment.

Reference is now made to FIG. 8, which shows an example flow diagram of a method 800 for identifying a conference call in accordance with an example embodiment. The method 800 can be performed by a host device 11a or by a non-host participant device 11, depending on the particular application. At step 802, the conference call application is installed, which acts as a trigger event for the method 800. Next, every calendar event record stored in the calendar is to be parsed (or in some embodiments, only those records from the present date onwards). Thus, at step 804 the first calendar event record is identified. At step 806, that calendar event record is parsed for conference call scheduling information. For example, the automatic discovery feature can be used. Also, the particular default address to be associated with the default join option can be identified. At step 808, the identifiers for the identified conference call scheduling information are generated and saved to memory. At step 810, this is repeated until all of the existing calendar event records are all parsed.

In some example embodiments, other triggers can also be used for starting the method 800 at step 802, such as each launching of the conference call application or waiting a periodic time period. In other example embodiments, only calendar event records from the current time to the future are parsed, wherein any past events are ignored.

At step 812, after the initial installation, going forward, the application can parse any calendar event record whenever a new event is added to the calendar application, such as when a new event is generated by the user using the calendar application, or a calendar event record is received or sent as an invitation message. At step 812, the device detects a new event record. The new event can be a result of a new event being created by the user, an invitation message being sent by the device, or an invitation message being received by the device. At step 814, that calendar event record is parsed for conference call scheduling information. For example, the automatic discovery feature can be used. Also, the particular default address to be associated with the default join option can be identified. At step 816, the identifiers for the identified conference call scheduling information are generated and saved to memory. This is repeated as necessary, as new event records are created, sent, or received by the device.

In some example embodiments, any message or natural language text (e.g. text document, e-mail thread, web chat) could be used as a basis for parsing for a potential conference call scheduling information, and can not be limited to calendar events.

It can be appreciated that the specific words as shown in the various user interfaces are intended to be illustrative only. For example, any suitable words or phrases can be used, and would not be limited to the English language. For example, any number of multi-lingual variations in different languages can be displayed or output from the device.

Variations of the above example systems and methods can be used. While some of the above examples have been described as occurring in a particular order, it will be appreciated to persons skilled in the art that some of the messages or steps or processes can be performed in a different order provided that the result of the changed order of any given step will not prevent or impair the occurrence of subsequent steps. Furthermore, some of the messages or steps described above can be removed or combined in other embodiments, and some of the messages or steps described above can be separated into a number of sub-messages or sub-steps in other embodiments. Even further, some or all of the steps of the conversations can be repeated, as necessary. Elements described as methods or steps similarly apply to systems or subcomponents, and vice-versa. Reference to such words as "sending"

or "receiving" could be interchanged depending on the perspective of the particular device.

Variations can be made to some example embodiments, which can include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments can be selected to create alternative embodiments comprised of a sub-combination of features which cannot be explicitly described above. In addition, features from one or more of the above-described embodiments can be selected and combined to create alternative embodiments comprised of a combination of features which cannot be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for identifying a conference call from a communication device, wherein the communication device includes a memory for storing a calendar event record, the method comprising:
    parsing at least some of the stored calendar event record, wherein the parsing is based on an automatic discovery feature;
    determining, based on the parsing, whether the stored calendar event record includes conference call scheduling information in relation to a scheduled conference call session;
    generating, based on the parsing, one or more identifiers for at least some of the conference call scheduling information, wherein an identifier of the one or more identifiers includes an identification of an address for contacting a conference call server for establishing the scheduled conference call session;
    storing in the memory the one or more identifiers;
    updating operating parameters of a display of the communication device to present a reminder interface for the scheduled conference call session including an graphical element for connecting to the scheduled conference call session; and
    in response to a user selecting the graphical element, updating operating parameters of the communication device to connect to the scheduled conference call session.

2. The method as claimed in claim 1, wherein at least some of the parsing is performed exclusive of any tags or fields contained within the calendar event record.

3. The method as claimed in claim 1, further comprising:
    identifying the address as a default address;
    associating the default address with a default join option for establishing the scheduled conference call session; and
    displaying an interface on the communication device including the default join option.

4. The method as claimed in claim 3, wherein the interface includes a reminder interface including the default join option displayed at a time of the scheduled conference call session, or a specified time beforehand.

5. The method as claimed in claim 3, wherein the identifying is performed exclusive of any tags or fields contained within the calendar event record.

6. The method as claimed in claim 1, wherein the address is one of a plurality of addresses contained in the stored calendar event record for contacting the conference call server.

7. The method as claimed in claim 1, wherein the address includes at least a phone number or an Internet address.

8. The method as claimed in claim 1, further comprising, prior to the parsing, receiving the stored calendar event record as an invitation message from a second communication device.

9. The method as claimed in claim 1, further comprising sending the stored calendar event record and the stored one or more identifiers as an invitation message to a second communication device.

10. The method as claimed in claim 1 wherein the automatic discovery feature includes feature-based learning.

11. The method as claimed in claim 1, wherein the automatic discovery feature includes using a whitelist.

12. The method as claimed in claim 1, wherein the automatic discovery feature includes reinforcement learning.

13. The method as claimed in claim 1, wherein the identifiers include at least a tag or a field, wherein the tag and the field correspond to conference call scheduling information within the calendar event record.

14. A non-transitory computer readable medium that stores a set of instructions that are executable by at least one processor to perform a method for identifying a conference call from a communication device, the method comprising:
    parsing at least some of a stored calendar event record, wherein the parsing is based on an automatic discovery feature;
    determining, based on the parsing, whether the stored calendar event record includes conference call scheduling information in relation to a scheduled conference call session;
    generating, based on the parsing, one or more identifiers for at least some of the conference call scheduling information, wherein an identifier of the one or more identifiers includes an identification of an address for contacting a conference call server for establishing the scheduled conference call session;
    causing the one or more identifiers to be stored in a memory;
    updating operating parameters of a display of the communication device to present a reminder interface for the scheduled conference call session including an graphical element for connecting to the scheduled conference call session; and
    in response to a user selecting the graphical element, updating operating parameters of the scheduled conference call session to connect to the conference call.

15. A communication device for facilitating the identification of a conference call, comprising:
    a communications subsystem;
    a memory for storing a calendar event record; and
    a controller configured to:
        parse at least some of the calendar event record, wherein the parsing is based on an automatic discovery feature;
        determine, based on the parsing, whether the stored calendar event record includes conference call scheduling information in relation to a scheduled conference call session;
        generate, based on the parsing, one or more identifiers for at least some of the conference call scheduling information, wherein an identifier of the one or more identifiers includes an identification of an address for contacting a conference call server for establishing the scheduled conference call session;

store in the memory the one or more identifiers;

update operating parameters of a display of the communication device to present a reminder interface for the scheduled conference call session including an graphical element for connecting to the scheduled conference call session; and in response to a user selecting the graphical element, update operating parameters of the communication device to connect to the scheduled conference call session.

16. The communication device as claimed in claim 15, wherein the controller is configured to at least parse some of the stored calendar event record exclusive of any tags or fields contained within the calendar event record.

17. The communication device as claimed in claim 15, wherein the controller is further configured to:

identify the address as a default address;

associate the default address with a default join option for establishing the scheduled conference call session; and display an interface on the communication device including the default join option.

18. The communication device as claimed in claim 17, wherein the interface includes a reminder interface including the default join option displayed at a time of the scheduled conference call session, or a specified time beforehand.

19. The communication device as claimed in claim 17, wherein the controller is configured to identify the address as the default address exclusive of any tags or fields contained within the calendar event record.

20. The communication device as claimed in claim 15, wherein the address is one of a plurality of addresses contained in the stored calendar event record for contacting the conference call server.

21. The communication device as claimed in claim 15, wherein the address includes at least a phone number or an Internet address.

22. The communication device as claimed in claim 15, wherein the communications subsystem is further configured to, prior to the parse, receive the calendar event record as an invitation message from a second communication device.

23. The communication device as claimed in claim 15, wherein the communications subsystem is further configured to send the stored calendar event record and the stored one or more identifiers as an invitation message to a second communication device.

24. The communication device as claimed in claim 15 wherein the automatic discovery feature includes feature-based learning.

25. The communication device as claimed in claim 15, wherein the automatic discovery feature includes using a whitelist.

26. The communication device as claimed in claim 15, wherein the automatic discovery feature includes reinforcement learning.

27. The communication device as claimed in claim 15, wherein the identifiers include at least one of tags and fields, wherein the tags correspond to conference call scheduling information within the calendar event record.

* * * * *